Nov. 6, 1923.
J. SIMONE
1,472,995
SPOON OR FORK HOLDER
Filed April 6, 1923
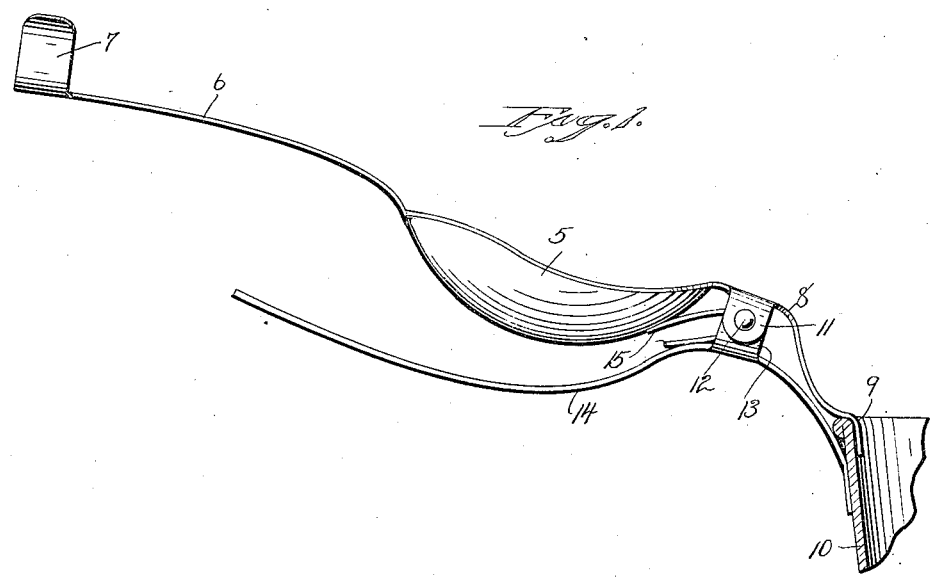
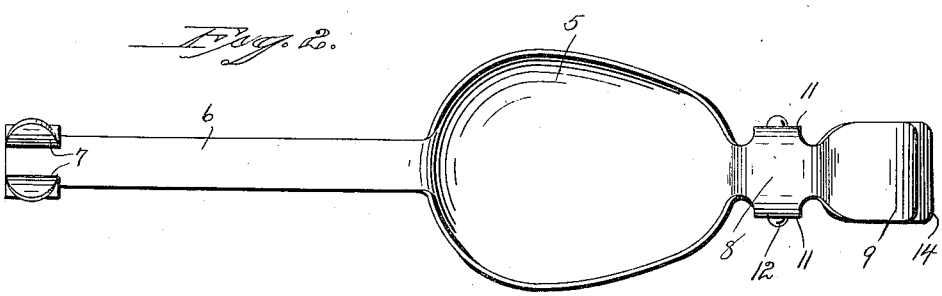

Patented Nov. 6, 1923.

1,472,995

UNITED STATES PATENT OFFICE.

JAMES SIMONE, OF SOUTHINGTON, CONNECTICUT.

SPOON OR FORK HOLDER.

Application filed April 6, 1923. Serial No. 630,193.

*To all whom it may concern:*

Be it known that I, JAMES SIMONE, a citizen of the United States, residing at Southington, in the county of Hartford and State of Connecticut, have invented a new and useful Improvement in Spoon or Fork Holders; and I do hereby dec'are the following, when taken in connection with the accompanying drawings and the characters of reference marked thereon, to be a full, clear, and exact description of the same, and which said drawings constitute part of this application, and represent, in—

Fig. 1, a side view of a spoon or fork holder for culinary vessels constructed in accordance with my invention.

Fig. 2, is a top or plan view of the same.

This invention relates to improvement in spoon or fork holders, and particularly to holders which are adapted to be used in connection with a culinary vessel for supporting the spoon upon the edge of the vessel. Various devices for the purpose of holding a spoon or fork have been produced when the device is applied to the edge of the vessel, but in most cases, when so applied it interferes with the usual cover.

The object of this invention is to produce an article for this purpose which shall have a receptacle into which the bowl of a spoon or the tines of a fork will extend and which will catch any dripping therefrom. A further object of the invention is to provide a device for this purpose which is so arranged that it will not interfere with the application of a cover to the utensil to which the device is applied, and the invention consists in the construction as hereinafter described and particularly recited in the claims In carrying out my invention, I employ a receptacle 5 of spoon-shape, provided with a handle 6 having spring-fingers 7, and at its outer end adapted to grasp the shank of a spoon or fork. From the tip of the spoon, an arm 8 projects forwardly and downwardly and terminates in an offset-finger 9 adapted to set over the upper edge of a vessel 10. The arm 8 is formed, on opposite sides, with downwardly-turned ears 11, and between them and connected by a rivet 12, are ears 13 extending upwardly from a bowed clamping arm 14, the inner end of which is adapted to bear against the outer wall of the vessel 10, against which it is yieldingly held by a spring 15 around the rivet 12 and bearing against the under-face of the receptacle 5 and the upper face of the clamping-arm 14.

This device is applied to the edge of the vessel by passing the finger 9 over the upper edge and allowing the clamping-arm to grip the outer wall, and when so positioned, a spoon or fork may be held with the bowl of the spoon or the tines of the fork resting in the receptac'e 5, in which position they are held by means of the fingers 7 gripping the shank of the spoon or fork. It will be noted that the finger 9, being offset, permits the application of the usual cover to the vessel 10, and when the device is removed, the contents of the spoon-like receptacle may be readily discharged.

I claim:

1. A spoon or fork holder for culinary vessels, comprising a spoon-like receptacle having an outwardly-extending arm provided with spring-fingers and with an arm extending inward'y from the tip and terminating in a downwardly offset-finger, a clamping-arm pivotally connected with said spoon-arm and a spring between the two members.

2. A spoon or fork holder for culinary vessels, comprising a spoon-like receptacle provided with a handle terminating in spring-fingers and provided at its tip with a forwardly-projecting arm terminating in a downwardly offset-finger, the said arm formed with downwardly-extending ears, a clamping-arm formed with upwardly-extending ears pivotally connected with the ears on the spoon-arm, and a spring arranged between the two members.

In testimony whereof, I have signed this specification in the presence of two subscribing witnesses.

JAMES SIMONE.

Witnesses:
JOSEPH SIRULLO,
JOSEPH M. MARTIN.